United States Patent
Novotny et al.

(10) Patent No.: US 11,422,879 B1
(45) Date of Patent: Aug. 23, 2022

(54) UNIVERSAL IN-BAND ERROR MASKING

(71) Applicant: XILINX, INC., San Jose, CA (US)

(72) Inventors: Andrew Thomas Novotny, Santa Clara, CA (US); Roger D. Flateau, Jr., San Jose, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 17/206,075

(22) Filed: Mar. 18, 2021

(51) Int. Cl.
    *G06F 11/07* (2006.01)
    *G06F 13/20* (2006.01)

(52) U.S. Cl.
    CPC ...... *G06F 11/0772* (2013.01); *G06F 11/0745* (2013.01); *G06F 11/0751* (2013.01); *G06F 13/20* (2013.01)

(58) Field of Classification Search
    CPC ............ G06F 11/0772; G06F 11/0751; G06F 11/0745; G06F 13/20
    USPC .......................................................... 714/57
    See application file for complete search history.

(56) References Cited

U.S. PATENT DOCUMENTS

2008/0126852 A1* 5/2008 Brandyberry ....... G06F 11/0745 714/6.13
2021/0255808 A1* 8/2021 Alameldeen ........ G06F 11/1076

* cited by examiner

*Primary Examiner* — Yair Leibovich
(74) *Attorney, Agent, or Firm* — Patterson + Sheridan, LLP (57) ABSTRACT

Embodiments herein describe error interceptors disposed along a bus that communicatively couples first and second circuits for redirecting in-band errors. That is, the error interceptors can block (or mask) in-band errors so they are not forwarded along the bus. Further, the error interceptors can redirect those errors such that they are converted into out-of-band errors. Moreover, the user can select which error interceptors to activate (e.g., block and redirect the errors) and which to deactivate (e.g., permit the in-band errors to pass). In this manner, the user can control which circuits receive in-band errors and which do not based on whether those circuits can handle the in-band errors.

17 Claims, 5 Drawing Sheets

UNIVERSAL IN-BAND ERROR MASKING

TECHNICAL FIELD

Examples of the present disclosure generally relate to masking or blocking in-band errors in a bus communications.

BACKGROUND

Many bus protocols such as Advanced eXtensible Interface (AXI) and Advanced Peripheral Bus (APB) standardize in-band errors. An in-band error is an error defined by a bus protocol that must satisfy a timing defined by the protocol. For example, in AXI and APB, a primary circuit (e.g., a processor) can use the bus to transmit a read or write command to a secondary circuit (e.g., a memory or memory controller). The secondary circuit transmits an acknowledgement message (ACK) back to the primary circuit. If something went wrong when attempting to complete the read or write command, the ACK may include bits indicating an error occurred (e.g., the primary circuit is not authorized to read or write to the memory location, or the memory location does not exist). This error is an in-band error because it is part of the AXI and APB protocol and is built into the format of the ACK message. In contrast, an out-of-band error is not part of the bus protocol. An example of an out-of-band error includes an interrupt or other error message that is not part of the timing or messaging defined by the bus protocol.

Receiving an in-band error at a primary circuit as part of an ACK message can cause the primary circuit to freeze or crash. If the primary circuit is a processor, the software or kernel executing on the processor may not know how to handle a hardware exception resulting for receiving an in-band error. This may cause the software to freeze or crash. Current solutions relies on designing the secondary circuits to not send these in-band errors, however, this may be difficult when the secondary circuits are developed by third-parties. Further, some of the primary circuits may be able to handle in-band errors while others cannot. It may be difficult or impossible to design a secondary circuit so that it provides ACK messages with in-band errors to some primary circuits but not to others (i.e., the primary circuits that cannot handle in-band errors).

SUMMARY

One embodiment describes an integrated circuit that includes a first circuit, second circuit, and a bus communicatively coupling the first and second circuit. The bus includes an error interceptor configured to identify an in-band error within a message transmitted between the first and second circuits on the bus, remove the in-band error from the message, forward the message without the in-band error, and report the in-band error to an error controller.

Another embodiment described herein is a method that includes activating a first error interceptor disposed on a bus based on configuration data, receiving a message at the first error interceptor containing an in-band error, removing, at the first error interceptor, the in-band error from the message and forwarding the message on the bus, and reporting the in-band error to an error controller.

Another embodiment described herein is an integrated circuit that includes a first circuit, second circuit, and a bus communicatively coupling the first and second circuit. The bus includes an a first error interceptor configured to identify and remove in-band errors, a second error interceptor configured to identify and remove in-band errors, and an interconnect, wherein the first error interceptor is connected between the first circuit and the interconnect and the second error interceptor is connected between the second circuit and the interconnect.

BRIEF DESCRIPTION OF DRAWINGS

So that the manner in which the above recited features can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe error interceptors that can be disposed along a bus that communicatively couples primary and secondary circuits for redirecting in-band errors. That is, the error interceptors can block (or mask) in-band errors so they are not forwarded to primary circuits while also redirecting those errors such that they are converted into out-of-band errors. Moreover, the user can select which error interceptors to activate (e.g., block and redirect the errors) and which to deactivate (e.g., permit the in-band errors to pass). In this manner, the user can control which primary circuits receive in-band errors and which do not based on whether those circuits can handle the in-band errors.

Further, while some error interceptors are deactivated such that they do not block in-band errors, these error interceptors can still identify and report in-band errors. That is, if a deactivated error interceptors receives a bus communication that includes an in-band error, it forwards the message with the in-band error, but may also report the in-band error to an error controller. An error interceptor further down on the bus may end up blocking and redirecting the in-band error before it reaches the primary circuit. Alternatively, the bus may permit the in-band error to reach the primary circuit (assuming it is capable of handling such an error). In this manner, the in-band errors can be reported to the error controller so that other components in the system can be informed that the in-band error occurred.

Figure 1:
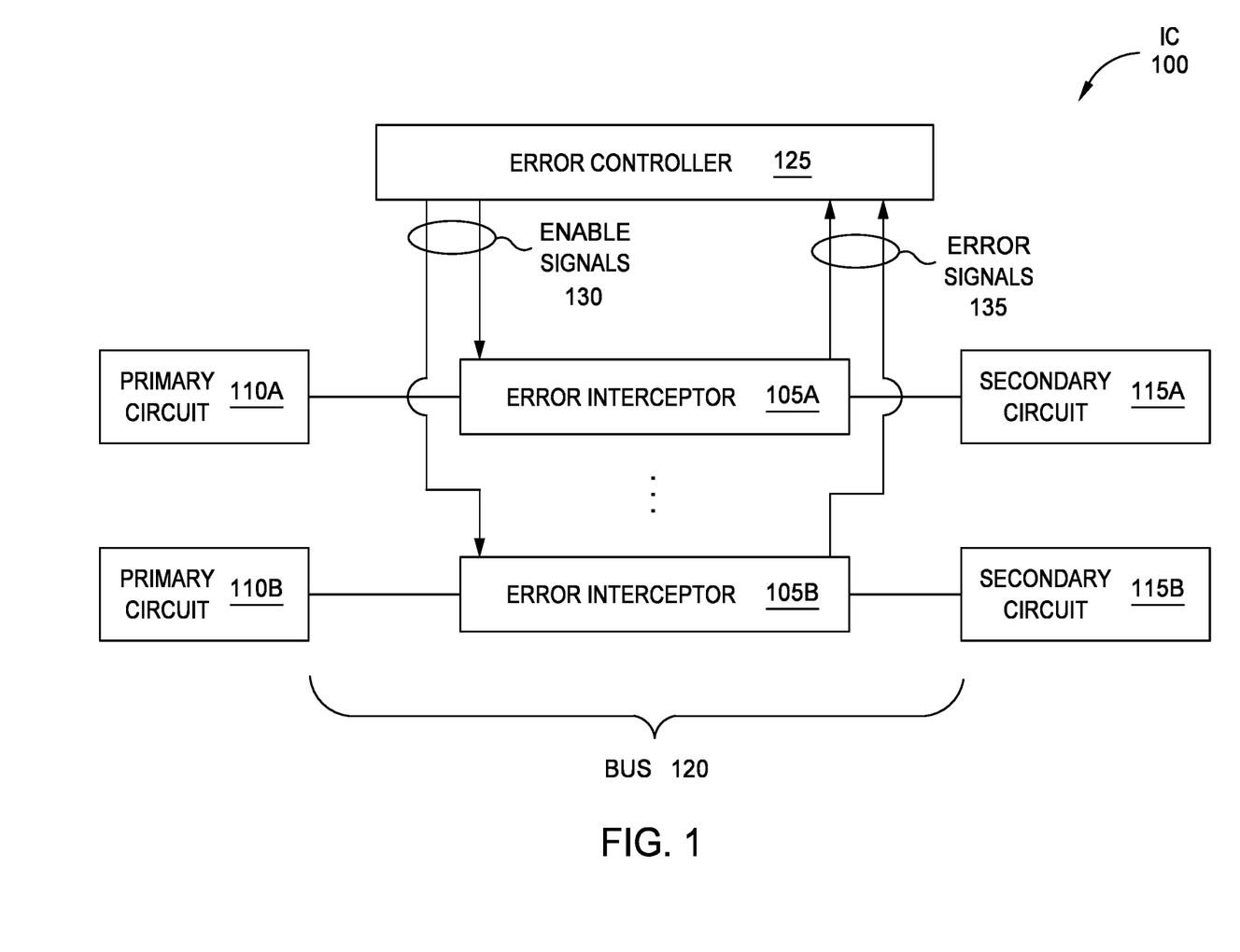
FIG. 1 is a block diagram of an integrated circuit (IC) with error interceptors disposed on a bus, according to an example.

FIG. 1 is a block diagram of an integrated circuit (IC) 100 with error interceptors 105 disposed on a bus 120, according to an example. As shown, the bus 120 facilitates communication between primary circuits 110 and secondary circuits 115. In one embodiment, the primary circuits 110 can communicate with any one of the secondary circuits 115. For example, the primary circuit 110 may transmit a read or write command (e.g., a bus message) to the secondary circuit 115A at Time A and then transmit a read or write command to the secondary circuit 115B at Time B. As defined by the bus protocol (e.g., AXI or APB), after receiving a command from a primary circuit 110 the secondary circuits 115 may transmit an ACK message back to the primary circuit 110. If the primary circuit 110 sent a write command, the ACK message may indicate that the secondary circuit 115 received the command and has performed (or is currently performing) the write. If the primary circuit 110 sent a read command, the ACK message from the secondary circuit 115 may include the requested data.

The primary circuits 110 may be processors or processing cores, while the secondary circuits 115 may be memory units, memory controllers, or I/O interfaces. But the embodiments herein are not limited to these types of hardware components, and can be used in any bus communication system that facilitates communication between two hardware modules using a bus protocol (whether AXI, APB, or others) that supports in-band errors.

The secondary circuit 115 may encounter an error when trying to fulfill the read or write command. For example, the primary circuit 110 may not have permission to read or write to the indicated memory address, or the primary circuit 110 may have referenced a memory location that does not exist. The secondary circuit 115 may then use bits in the ACK message as defined by the bus protocol to indicate an error occurred. This is referred to as an in-band error since the error is reported to the primary circuit 110 according to the timing defined by the bus protocol since the error is reported in-line with the ACK message.

These in-band errors can cause undesirable consequences when received by the primary circuits 110. That is, if the ACK messages containing the in-band errors were permitted to reach the primary circuits 110, they may cause the circuit 110 to freeze, crash, or otherwise become responsive. For example, certain primary circuits 110 may be executing a kernel or software that is not designed to handle the hardware exceptions generated when the primary circuits 110 receive the in-band errors. To prevent an in-band error from reaching a primary circuit 110 that cannot handle these errors, the bus 120 includes the error interceptors 105 that can detect and block these errors. In one embodiment, the error interceptor 105 can mask the bits in the ACK message indicating an in-band error occurred before forwarding the message on the bus 120. For example, if the secondary circuit 115A transmits an ACK message to the primary circuit 110A, the error interceptor 105A can first remove or mask the bits in the ACK message indicating the in-band error occurred and then forward the altered ACK message to the primary circuit 110A. Thus, when receiving the ACK message, the primary circuit 110A does not know an error occurred. As a result, the primary circuit 110A would not generate the hardware exception that can cause the undesirable consequence.

Upon blocking or masking an in-band error, the error interceptors 105 can report the error to an error controller 125. That is, while blocking the in-band errors can avoid the undesirable consequences at the primary circuit 110, the IC 100 may still want to report the error using different communication means which do not cause the undesirable consequences at the primary circuit 110. In FIG. 1, the error interceptors 105 can transmit error signals 135 to the error controller 125 when they block or mask an in-band error. These error signals can indicate that an in-band error was detected and the type of the error. In response, the error controller 125 can transmit an interrupt or publish the error for other components in the IC 100. In one embodiment, the interrupt may be sent to the primary circuit 110 that was the destination of the in-band error signal. However, since the error is reported to the primary circuit 110 as an out-of-band error rather than an in-band error, the primary circuit 110 may be able to handle the error without causing negative consequences. In this manner, the primary circuits 110 (and other components in the IC 100) can be informed of errors without those errors being transmitted as in-band errors.

However, a user may want to permit in-band errors to reach some of the primary circuits 110. For example, while primary circuit 110A may execute software that is unable to handle in-band errors, the primary circuit 110B has software that can process the in-band errors. In that case, the error interceptor 105A may block in-band errors (and convert them to out-of-band errors as discussed above) while the error interceptor 105B can permit ACK messages containing in-band errors to reach the primary circuit 110B. To selectively activate certain error interceptors 105, the error controller 125 can use enable signals 130. For example, the enable signals 130 may activate the error interceptor 105A so that it blocks and redirects in-band errors but deactivate the error interceptor 105B so it permits in-band errors to reach the primary circuit 110B. In this manner, a user can configure the hardware in the bus 120 at, or before, runtime to selectively block in-band errors.

There are several advantages to disposing error interceptors 105 in the bus 120 rather than requiring the secondary circuits 115 handle in-band errors. First, the designer of the IC 100 may not have designed the secondary circuit 115. These circuits 115 may be designed by a third party, and thus, the IC designer may not control whether the secondary circuits 115 do or do not transmit in-band errors. Second, the secondary circuits 115 may not know which primary circuits 110 can or cannot handle in-band errors. For example, the secondary circuit 115 may not know that the primary circuit 110A cannot handle in-band errors but the primary circuit 110B can. Thus, when designed, the secondary circuit 115 may always transmit in-band errors when they occur or never transmit in-band errors, even when the ACK message is destined to a primary circuit that can handle in-band errors. Instead, by adding the error interceptors 105 to the bus 120, the user (who does know which primary circuit 110 can and cannot handle in-band errors) can selectively enable the error interceptors 105 so that only the primary circuits 110 that can handle in-band errors receive them while the other do not. Thus, it does not matter whether the secondary circuits 115 do or do not transmit in-band errors since this can be handled by the error interceptors 105. Thus, the error interceptors 105 provide greater flexibility to the user to configure the IC 100 to satisfy the particular capabilities of the primary circuits 110 according to their implementation.

While the embodiments herein disclose using the error interceptors 105 to block and redirect in-band errors transmitted from the secondary circuits 115 to the primary circuit 110, the error interceptors 105 can be used to block in-band errors in either direction. Further, while the FIG. 1 describes the in-band error messages being part of ACK message, the embodiments herein could be used if in-band errors are in-line with other types of messages being communicated on the bus 120.

Figure 2:
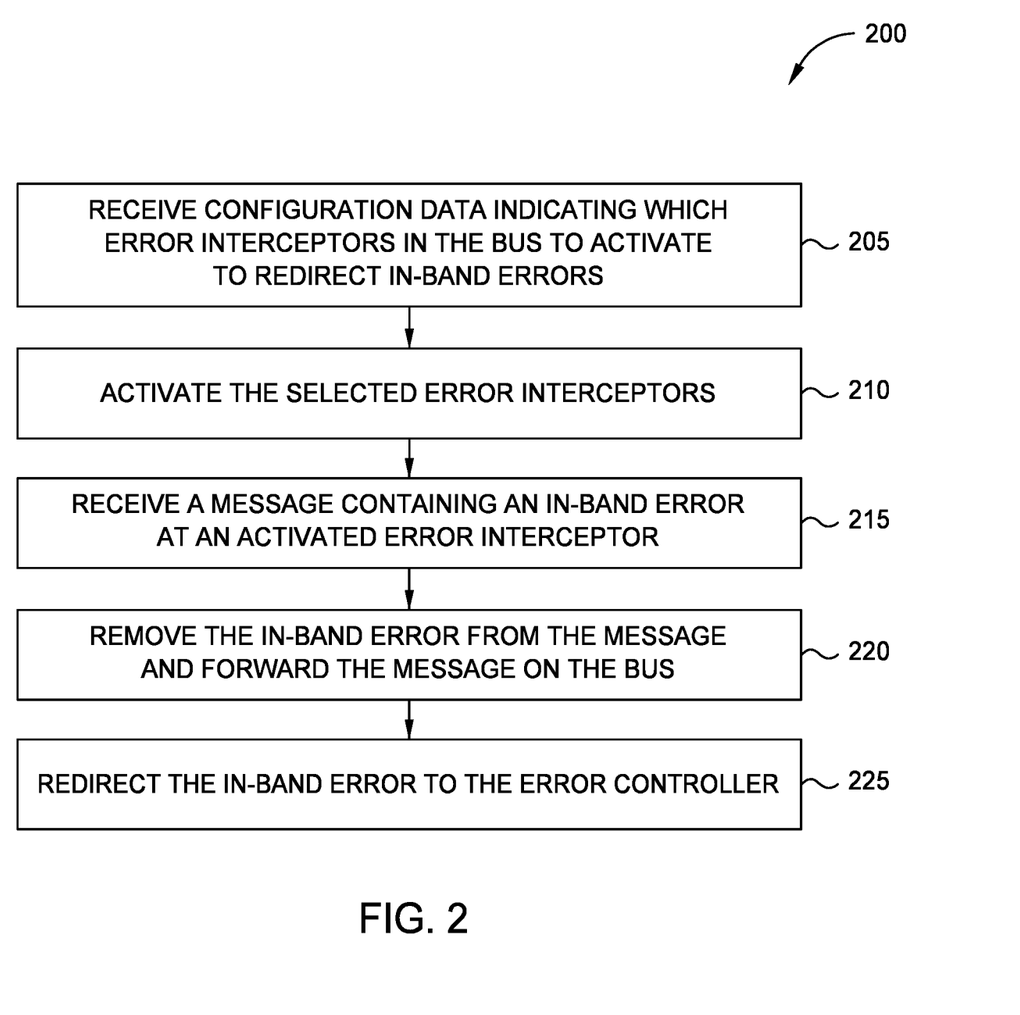
FIG. 2 is a flowchart for selectively activating error interceptors on a bus, according to an example.

FIG. 2 is a flowchart of a method 200 for selectively activating error interceptors on a bus, according to an example. At block 205, the IC receives configuration data indicating which error interceptors in the bus to activate to redirect in-band errors. That is, the user may know which primary circuits attached to the bus should be protected from in-band errors and which can receive the in-band errors. The user can then create the configuration data that indicates which of the error interceptors should be active and which can be inactive.

At block 210, the error controller activates the selected error interceptors while the remaining error interceptors are deactivated. In one embodiment, an active error interceptors identifies and prevents in-band errors from reaching their intended destination (whether that destination is a primary circuit or a secondary circuit). The activate error interceptors can also redirect the in-band errors to the error controller so that knowledge of the error is not lost. In contrast, inactive error receptors may not block in-band errors, but may pass the messages containing the errors without altering them. However, in another embodiment described later in FIG. 4, the inactive error receptors may still monitor and report messages that contain in-band errors even though they do not block the in-band errors.

At block 215, an active error interceptor receives a message containing an in-band error. For example, the active error interceptor may be disposed on the bus between a secondary circuit and a primary circuit as shown in FIG. 1 so that messages pass through the interceptor. The error interceptor can include circuitry (or logic) that evaluates the message to determine whether it indicates that an error occurred. That is, the bus protocol may define a bit (or bits) in a message (e.g., an ACK message) that can be set by the secondary circuit to indicate the occurrence of an error. The error interceptor can evaluate the message to determine whether that bit (or bits) is set to a value indicating an error occurred.

Further, the bus protocol may define multiple types of errors that can be reported as in-band errors. For example, by assigning multiple bits in the ACK message for reporting in-band errors, the secondary circuits can use different bit combinations to indicate the type of the error that occurred. The error interceptors can then identify that the message includes an in-band error and its type.

In one embodiment, the error interceptors are configured to block certain types of in-band errors but permit other types of in-band errors to pass through. For example, if a primary circuit can process a first type of in-band error but not a second type, the configuration data received at block 205 may indicate that a corresponding error interceptor should block the first type of in-band error but not block the second type. Alternatively, activating an error interceptor may result in it blocking all types of in-band errors.

At block 220, the activated error interceptor removes the in-band error from the bus message and forwards the altered message to its destination on the bus. In one embodiment, the error interceptor masks or resets the bit or bits in the message that indicates the message contains an in-band error. That way, when the message is received at its destination, e.g., a primary circuit, it does not know that an in-band error occurred.

Further, the message may pass through multiple error interceptors as it traverses through the bus. To block the in-band error, only one of the multiple error interceptors has to be active, although the message may pass through multiple active error interceptors. For instance, when the message is received at an active error interceptor, the interceptor mask/removes the in-band error from the message. This altered message may then be received by one or more other active or inactive error interceptors as it travels along the bus. However, since in the in-band error has already been removed from the message, any downstream active error interceptors do not alter the message.

At block 225, the active error interceptor redirects the in-band error to the error controller. Because the system may not want to lose track of the blocked in-band error, the active error interceptor can convert the in-band error to an out-of-band error by redirecting information regarding the error to the error controller. In one embodiment, after removing an in-band error from a message, the error interceptor transmits a notification to the error controller. This notification can indicate that an in-band error was removed, and if applicable, the type of error. That way, the error controller can take an action to publish or push this error to other components in the IC, such as the primary circuit that was the destination of the message. The error controller can publish the errors in a uniform way where a system host or primary circuit can read or receive the error and process the error in a way that does not cause undesirable consequences.

Figure 3:
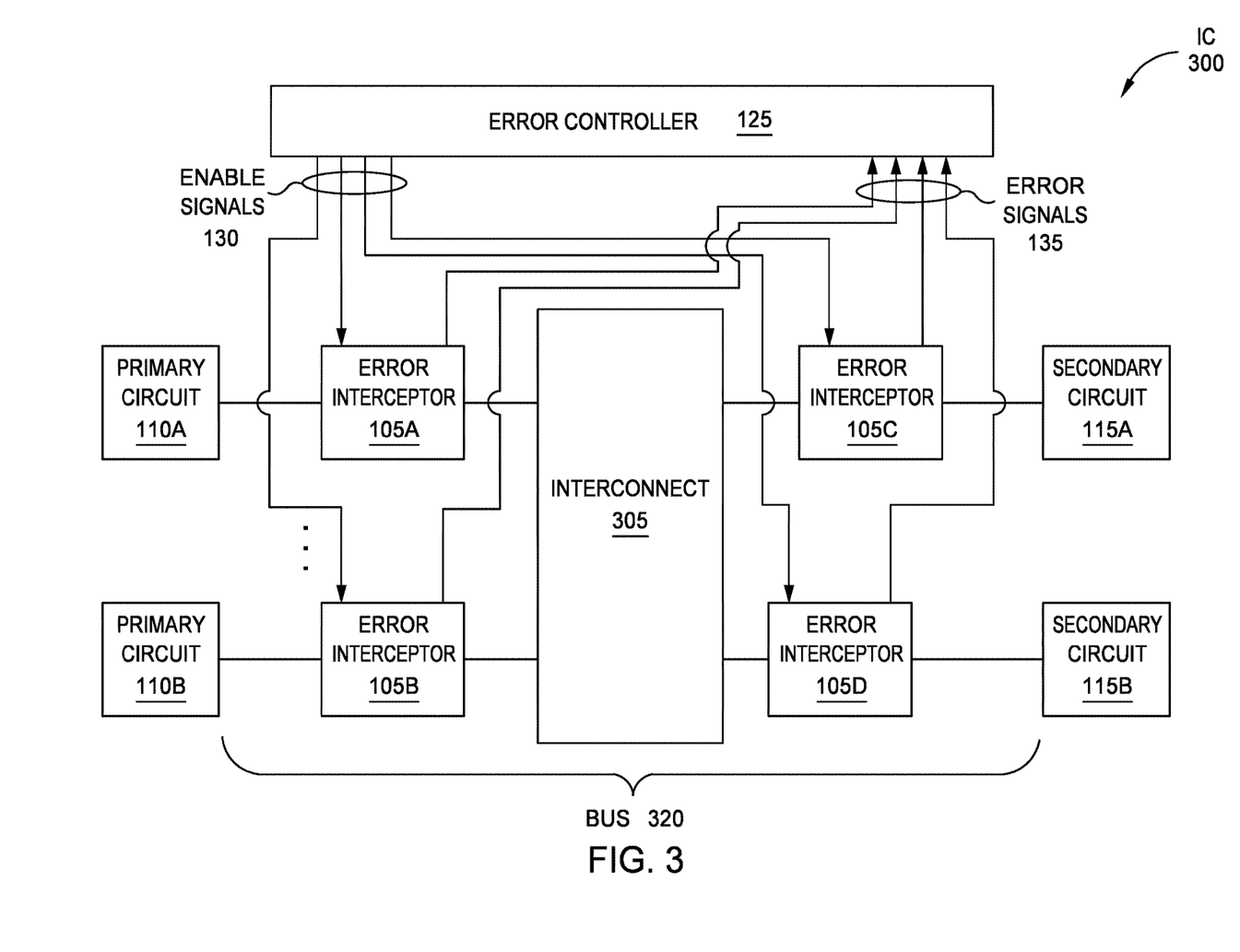
FIG. 3 is a block diagram of an IC with error interceptors disposed on a bus, according to an example.

FIG. 3 is a block diagram of IC 300 with error interceptors disposed on a bus 320, according to an example. Like in FIG. 1, the IC 300 has primary circuits 110 and secondary circuits 115 that are communicatively coupled with a bus 320 that includes multiple error interceptors 105. However, the bus 320 includes an interconnect 305 that permits routing between the primary circuits 110 and secondary circuits 115 so that each primary circuit 110 can communicate with each secondary circuit 115. In one embodiment, the interconnect 305 is a crossbar or other routing element.

Using the enable signals 130, the error controller 125 can selectively activate and deactivate the error interceptors 105. For example, by activating the error interceptor 105C, the error controller 125 ensures any ACK messages containing in-band errors transmitted by the secondary circuit 115 are blocked before progressing to the interconnect 305 or other error interceptors 105. By activating both the error interceptors 105C and 105D, the user can ensure that neither secondary circuit 115 can transmit in-band errors.

Alternatively, the user may want to permit in-band errors to reach the primary circuit 110A, which can process them successfully, but not the primary circuit 110B which cannot. In that case, the user can instruct the error controller 125 to activate the error interceptor 105B so that all messages being received by the primary circuit 110B are scrubbed for in-band errors, but deactivate the error interceptors 105A, 105C, and 105D. That way, if the secondary circuits 115 transmit an ACK message to the primary circuit 110A that includes an in-band error, the error interceptors 105 permit this in-band error to reach the primary circuit 110A.

As mentioned above in the method 200, the error interceptors 105 may also be configured to permit some types on in-band errors to pass while blocking other types of in-band errors. In any case, once an in-band error is removed, the error interceptors 105 can use the error signals 135 to report the error to the error controller 125 as an out-of-band error.

The error controller 125 can then decide how to handle the error such as storing it in an interrupt register, publishing the error to multiple components in the IC 300, or simply storing the error for later access.

In another embodiment, the bus 320 can include multiple interconnects 305 with one or more error interceptors 105 disposed between. The error interceptor 105 can detect errors in messages transmitted between the two interconnects along the bus 320.

Figure 4:
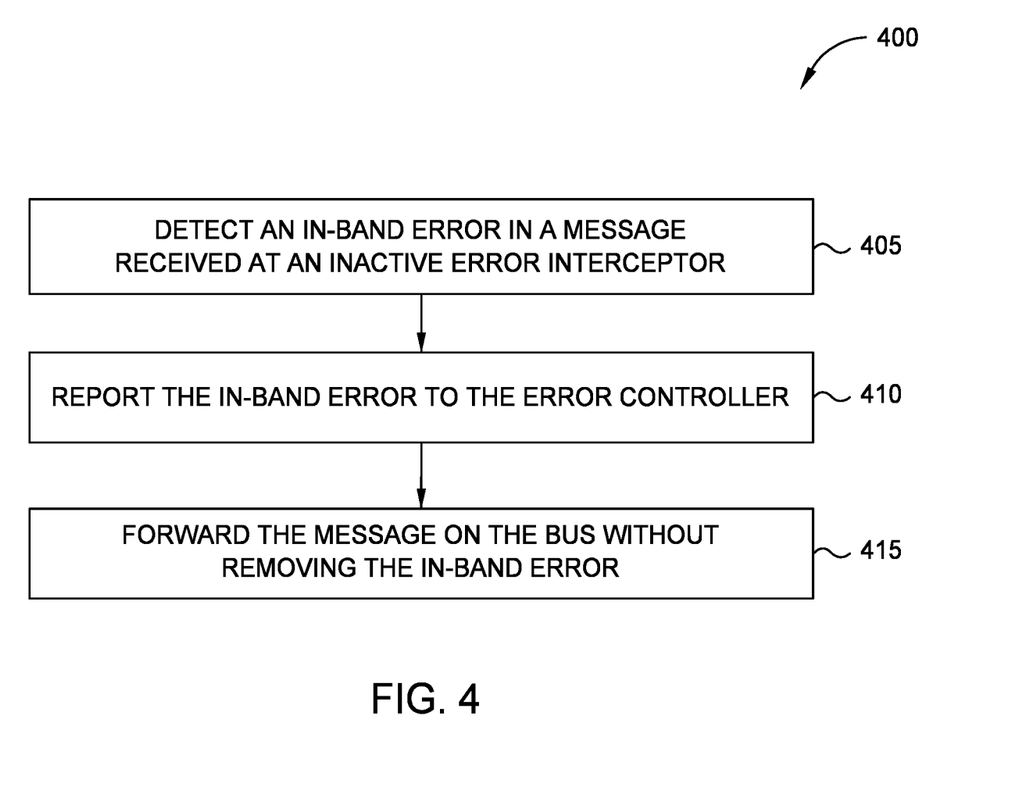
FIG. 4 is a flowchart for reporting in-band errors without redirecting them using error interceptors, according to an example.

FIG. 4 is a flowchart of a method 400 for reporting in-band errors without redirecting them using error interceptors, according to an example. In one embodiment, the method 400 begins after method 200 has executed where there is at least one active error interceptor and one inactive error interceptor in the bus. However, there may be multiple active and multiple inactive error interceptors along the bus.

At block 405, an inactive error interceptor detects an in-band error in a received message. As mentioned above, the inactive error interceptor does not remove in-band errors from messages transmitted along the bus. However, despite being inactive, the error interceptor may still monitor the message to determine whether it contains an in-band error. For example, the logic in the inactive error interceptor may evaluate the bit locations in the message assigned by the bus protocol to indicate an in-band error. Thus, while an inactive error interceptor does not remove in-band errors, in this embodiment, it can still identify in-band errors in received messages.

At block 410, the inactive error interceptor reports the in-band error to the error controller. That is, similar to the active error interceptors that report in-band errors to the error controller (to convert them to out-of-band errors), the inactive error interceptors can inform the error controller when they receive an in-band error.

The error controller can then store the in-band error in a register so that another component can identify that an in-band error occurred in the system. Thus, even if the in-band error is permitted to reach the primary circuit, by transmitting an indication of the in-band error to the error controller, other components besides the primary circuit can be informed of the error.

In another embodiment, the error controller may use the inactive error interceptors to track the in-band errors in the bus. That is, as the message is received at more inactive error interceptors, they can each report the error the error controller.

At block 415, the inactive error interceptor forwards the received message on the bus without removing the in-band error. That is, in this embodiment, the inactive error interceptor monitors and reports in-band errors but does not remove them from the messages. As a result, the message is allowed to proceed on the bus towards its destination still containing the in-band error. In one embodiment, the bus is configured so that the in-band error is permitted to reach the primary circuit. However, in another embodiment, an active error interceptor downstream from the inactive error interceptor identifies and removes the error before it reaches the primary circuit.

Figure 5:
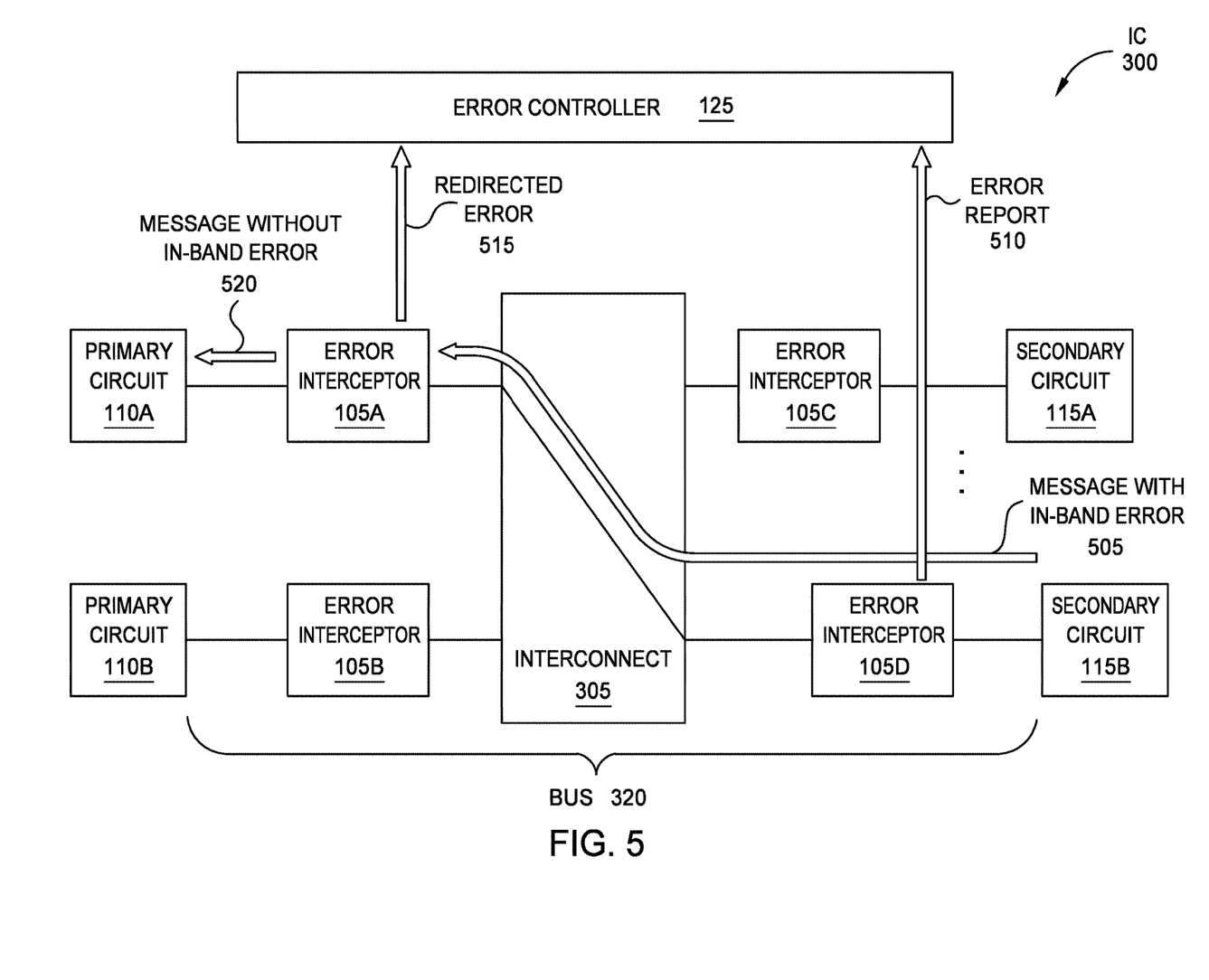
FIG. 5 is a block diagram of a first inactive error interceptor that reports in-band errors and a second active error interceptor that redirects in-band errors, according to an example.

FIG. 5 is a block diagram of a bus 320 with a first error interceptor that reports in-band errors and a second error interceptor that redirects in-band errors, according to an example. In one embodiment, FIG. 5 illustrates one example of the method 400 where an inactive error interceptor reports an in-band error but does not remove the error from the message.

In this example, the secondary circuit 115B transmits a message 505 with an in-band error to the error interceptor 105D which the error controller has set as an inactive error interceptor. Thus, using the method 400, the error interceptor 105D identifies the in-band error in the message 505 and transmits an error report 510 to the error controller. The error interceptor 105D then forwards the message 505 (which still contains the in-band error) to the interconnect 305 which routes the message 505 to the error interceptor 105A.

Unlike the interceptor 105D, in this example the error interceptor 105A is an active error interceptor that identifies and removes in-band errors (or a specific type of in-band error). Thus, as shown in FIG. 5, the error interceptor 105A transmits a redirected error 515 to the error controller 125. In other words, the in-band error is converted to an out-of-band error.

In parallel, the error interceptor 105A removes or masks the in-band error in the message. As a result, the error interceptor 105A transmits a message 520 that does not contain the in-band error. Thus, when the message 520 is received at the primary circuit 110A, it does not know that the message 520 contained an in-band error when it was transmitted by the secondary circuit 115B. As discussed above, the primary circuit 110A can learn of the error using out-of-band means such as an interrupt or by polling a register in the error controller.

Thus, FIG. 5 illustrates a bus 320 where some error interceptors can be active while others are inactive. Moreover, the inactive error interceptors can still be used to track the in-band errors and report these errors to the error controller, even if the inactive error interceptors do not remove the in-band errors from the messages.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) comprising:
a first circuit;
a second circuit; and
a bus communicatively coupling the first and second circuits, the bus comprising:
an error interceptor configured to:
identify an in-band error within a message transmitted between the first and second circuits on the bus, wherein the in-band error is disposed in the message at bit locations assigned by a bus protocol;
remove the in-band error from the message;
forward the message without the in-band error; and
report the in-band error to an error controller.

2. The IC of claim 1, wherein the error controller and the error interceptor are configured to convert the in-band error to an out-of-band error that is not part of the bus protocol.

3. The IC of claim 1, wherein the bus comprises a second error interceptor, wherein the second error interceptor is configured by the error controller as an inactive error interceptor that does not remove in-band errors from received messages.

4. The IC of claim 3, wherein the second error interceptor is configured to identify and report in-band errors in the received messages to the error controller without removing the in-band errors.

5. The IC of claim 1, wherein the first circuit is a secondary circuit and the second circuit is a primary circuit, and wherein the message is an acknowledge (ACK) message sent by the secondary circuit in response to a read or write command transmitted by the primary circuit, wherein the secondary circuit embeds the in-band error in the ACK message in response to encountering an error when attempting to perform the read or write command.

6. The IC of claim 1, wherein the bus comprises a plurality of error interceptors, wherein the error controller is configured to selectively activate and deactivate the plurality of error interceptors according to user configuration data.

7. An IC comprising:
   a first circuit;
   a second circuit; and
   a bus communicatively coupling the first and second circuits, the bus comprising:
      a first error interceptor configured to identify and remove in-band errors,
      a second error interceptor configured to identify and remove in-band errors, and
      an interconnect, wherein the first error interceptor is connected between the first circuit and the interconnect and the second error interceptor is connected between the second circuit and the interconnect.

8. The IC of claim 7, wherein the first and second error interceptors are selectively configurable to operate as active error interceptors that remove the in-band errors and inactive error interceptors that forward messages containing the in-band errors without removing the in-band errors, wherein the first circuit comprises one of a processor or a first interconnect and the second circuit comprises one of a memory or a second interconnect.

9. The IC of claim 7, wherein the second error interceptor is further configured by an error controller as an inactive error interceptor that does not remove in-band errors from received messages.

10. The IC of claim 7, wherein the first circuit is a secondary circuit and the second circuit is a primary circuit, and wherein a message is an acknowledge (ACK) message sent by the secondary circuit in response to a read or write command transmitted by the primary circuit, wherein the secondary circuit embeds the in-band error in the ACK message in response to encountering an error when attempting to perform the read or write command.

11. The IC of claim 7, wherein the bus comprises a plurality of error interceptors, wherein an error controller is configured to selectively activate and deactivate the plurality of error interceptors according to user configuration data.

12. An integrated circuit (IC) comprising:
   a first circuit;
   a second circuit; and
   a bus communicatively coupling the first and second circuits, the bus comprising:
      an error interceptor configured to:
         identify an in-band error within a message transmitted between the first and second circuits on the bus;
         remove the in-band error from the message;
         forward the message without the in-band error; and
         report the in-band error to an error controller, and
      a plurality of active error interceptors configured to identify in-band errors in received bus messages, remove the in-band errors, and report the in-band errors to the error controller.

13. The IC of claim 12, wherein the bus comprises a plurality of inactive error interceptors configured to forward the bus messages containing the in-band errors without removing them.

14. The IC of claim 13, wherein the bus comprises an interconnect, wherein a first set of the pluralities of active and inactive error interceptors is coupled between the interconnect and a plurality of primary circuits coupled to the bus, and a second set of the pluralities of active and inactive error interceptors is coupled between the interconnect and a plurality of secondary circuits coupled to the bus.

15. The IC of claim 12, wherein the bus comprises a second error interceptor, wherein the second error interceptor is configured by the error controller as an inactive error interceptor that does not remove in-band errors from received messages.

16. The IC of claim 12, wherein the first circuit is a secondary circuit and the second circuit is a primary circuit, and wherein the message is an acknowledge (ACK) message sent by the secondary circuit in response to a read or write command transmitted by the primary circuit, wherein the secondary circuit embeds the in-band error in the ACK message in response to encountering an error when attempting to perform the read or write command.

17. The IC of claim 12, wherein the plurality of active error interceptors, wherein the error controller is configured to selectively activate and deactivate the plurality of active error interceptors according to user configuration data.

* * * * *